(No Model.)  3 Sheets—Sheet 1.

C. M. BALL.
CIRCUIT REGULATING DEVICE FOR ELECTRIC LIGHTS.

No. 252,347. Patented Jan. 17, 1882.

Witnesses
Chas H Smith
J. Hail

Inventor
Clinton M. Ball.
Lemuel W. Serrell atty (No Model.) 3 Sheets—Sheet 2.

C. M. BALL.
CIRCUIT REGULATING DEVICE FOR ELECTRIC LIGHTS.

No. 252,347. Patented Jan. 17, 1882.

Witnesses
Chas. H. Smith
J. Hails

Inventor
Clinton M. Ball
per Lemuel W. Serrell
Atty

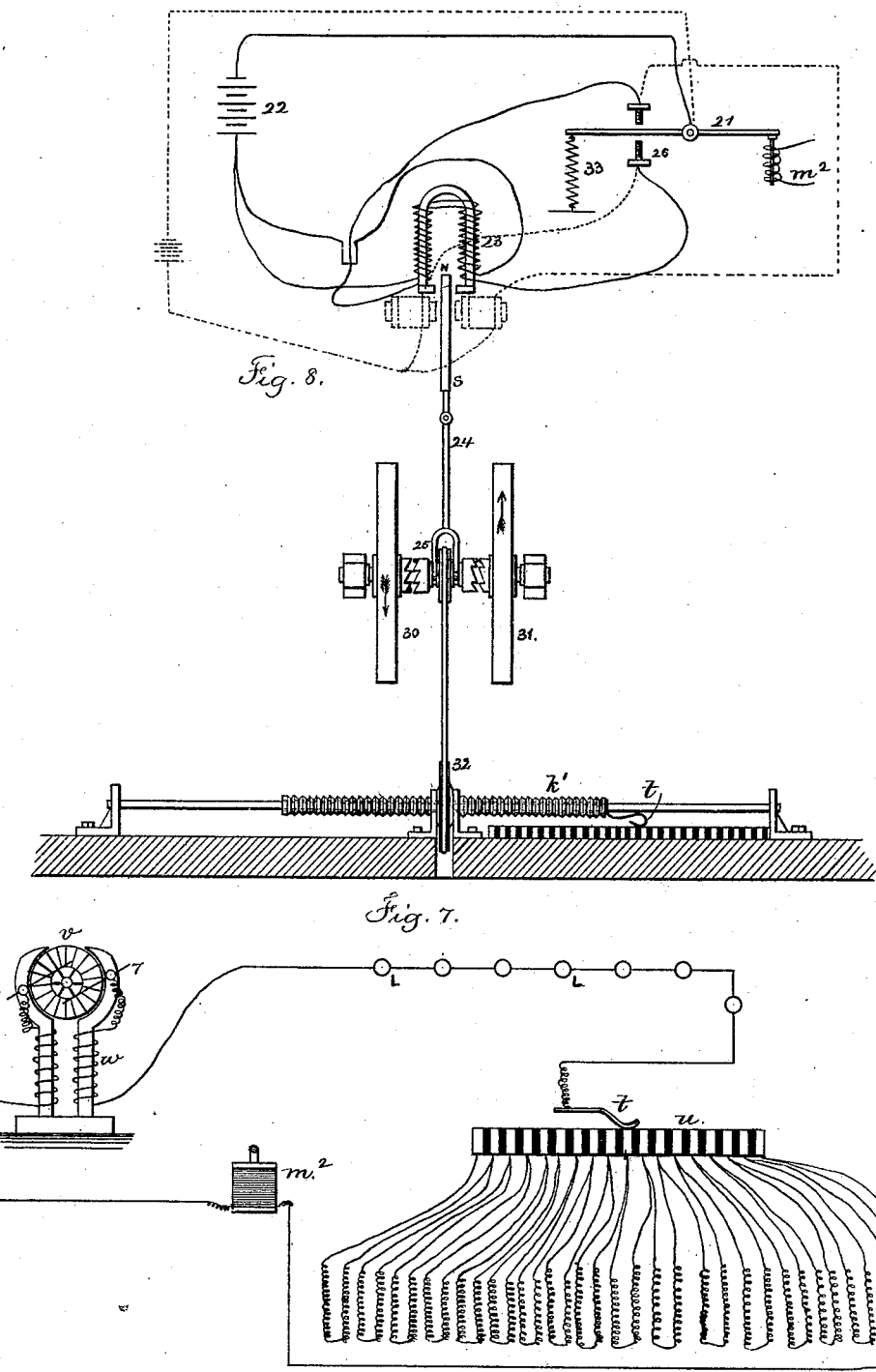

UNITED STATES PATENT OFFICE.

CLINTON M. BALL, OF TROY, NEW YORK, ASSIGNOR TO HIMSELF AND JOHN B. TIBBITS, OF SAME PLACE.

CIRCUIT-REGULATING DEVICE FOR ELECTRIC LIGHTS.

SPECIFICATION forming part of Letters Patent No. 252,347, dated January 17, 1882.

Application filed March 16, 1881. (No model.)

*To all whom it may concern:*

Be it known that I, CLINTON M. BALL, of Troy, in the county of Rensselaer and State of New York, have invented an Improvement in Circuit-Regulating Devices for Electric Lights, &c., of which the following is a specification.

Electric lamps, magnetic motors, and other devices actuated by electricity have in some instances been arranged with the circuit running through a number of such devices, and in other instances the lamps or other devices have been arranged in multiple arc, so that the current is divided in passing through the numerous lights.

My invention relates, first, to a peculiar automatic rheostat, whereby the electric current is made self-regulating; and, second, to a peculiar arrangement of branch or shunt circuits in which the rheostat and its actuating electromagnet are placed, so that by regulating the rheostat in a shunt or branch circuit the power of the dynamo-electric machine is varied in proportion to the work to be done by it.

Figure 1:
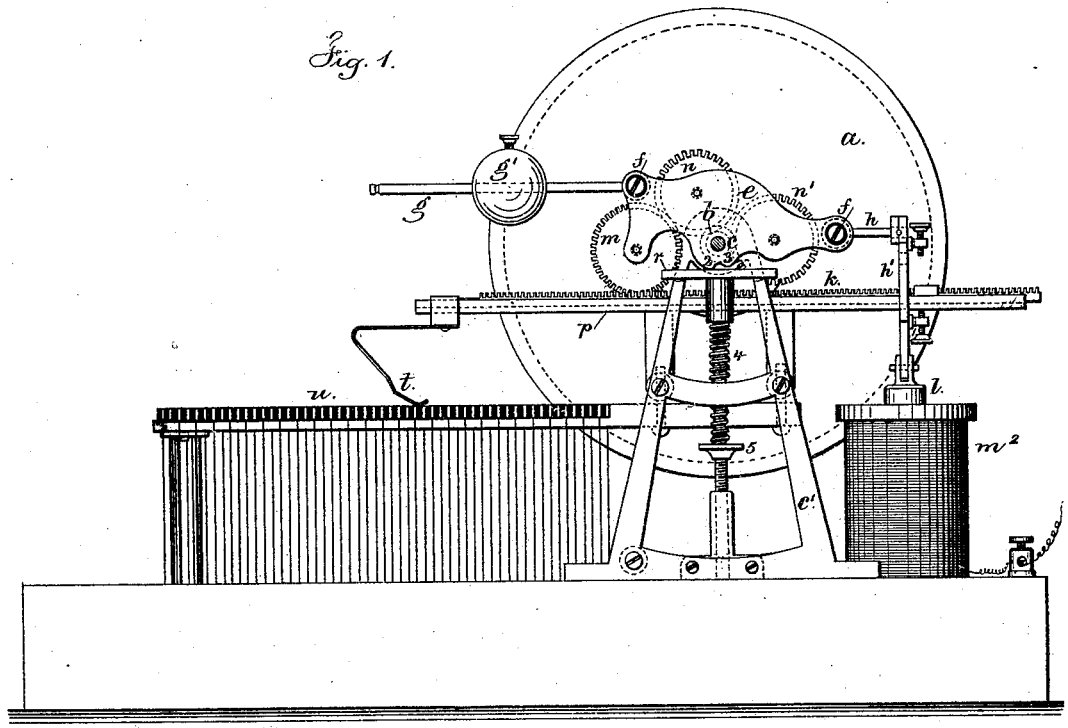
Figure 2:
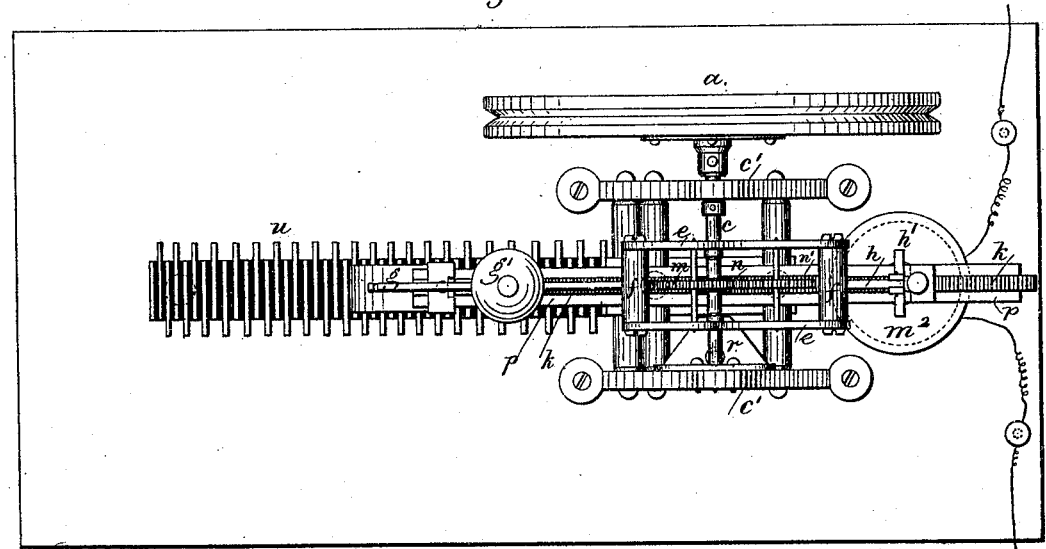

In the drawings, Figure 1 is an elevation of the rheostat with part of the frame removed, and Fig. 2 is a plan of the same. Figs. 3, 4, 5, and 6 are diagrams of the circuit-connections.

I make use of an electromotor or any other source of power for turning continuously the wheel $a$, shaft $c$, and the pinion $b$. These parts are supported in a frame, $c'$, of suitable size and shape. Upon the shaft there is a rocking frame composed of the side pieces, $e\ e$, that are connected by the pillars $f$, and at one end of this frame is a lever-arm, $g$, and adjustable weight $g'$, and at the other end is the lever-arm $h$, with a bridle, $h'$, that passes at each side of the rack $k$, and is connected to the upper end of the core $l$ of the axial magnet $m^2$.

Within the frame $e\ f$ there are the wheels $m\ n$, that are geared together, and the wheel $n$ gears with the pinion $b$, and there is also another wheel, $n'$, in gear with $b$. The rack $k$ has teeth on its upper surface, and it is supported in the guide $p$, through which it may be moved endwise by the action of the wheels $m$ or $n'$. The construction of the parts is such that when the frame is in a normal position the teeth of the wheels $m\ n'$ do not touch the teeth of the rack, and hence the wheels may continue to revolve and will not act upon or change the rheostat, and a small force is applied to maintain the parts in this position—viz., the spring-table $r$, that is pressed upwardly against the two cams or knuckles 2 and 3 by the spring 4 and adjusting-nut 5. If the magnetism in $m^2$ is increased the axial core is moved endwise to engage the teeth of $n'$ with those of the rack, and hence the rack will be moved to the right by the continuous turning of the wheel $a$. If the force of the axial electro-magnet $m^2$ sinks below the normal condition, then the weight $g'$ and lever $g$ bring the wheel $m$ into contact with the teeth of the rack and move the same to the left.

The rack $k$ is provided with a contact-spring, $t$, that rests upon a surface composed of bars of metal with intervening hard rubber or other non-conducting material, as seen at $u$, and to these bars are connected the terminals of resistance coils or helices, as seen in Figs. 3, 4, 5, and 6. One circuit-connection being made to the contact-spring $t$ and the other circuit-connection being made to the end of the rheostat-coils, it will be apparent that when the contact-spring $t$ is moved to the right the number of rheostat-coils through which the circuit passes will be lessened, and when moved to the left that number will be increased.

In the diagrams, Figs. 3, 4, 5, and 6, the parts of the self-acting rheostat are indicated by the letters of reference as in Figs. 1 and 2.

The dynamo-electric machine is indicated by the revolving armature of coils $v$ and the field-of-force magnets $w$, and 6 and 7 show the commutator-springs. The circles L represent light magnetic motors or other devices to be operated by the electric current.

Figure 3:
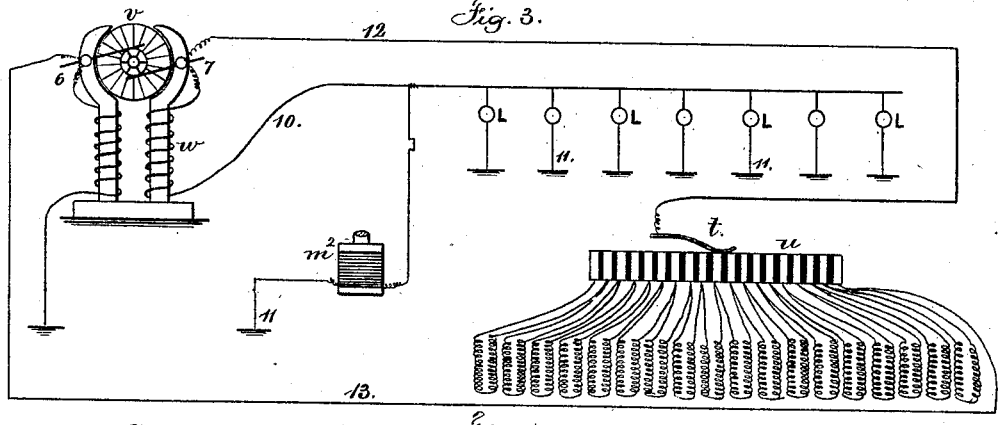

In Fig. 3 there are two main circuits. The first one passes from the commutator-springs through the helices of the field-magnets and to the ground and line 10, respectively, thence through the lamps or other working devices in multiple arc, and returning by the ground-circuits 11, the helix $m^2$ of the axial magnet also being one of the multiple-arc connections. The other main circuit passes from one commutator-spring, by wire 12, to the contact-spring $t$, through the rheostat, and back to the other commutator-spring by the wire 13. If there were no resistance in the circuit 12 13, the electro-motive force set up in the armature-helices of the dynamo-machine would return direct to such helices, and not augment the magnetism in the field-magnets, and hence the electro-motive force of the generator is practically nothing, and in proportion to the resistance in the circuit 12 13, so more or less current will be forced through the field-magnets and circuit 10 11.

The parts are to be adjusted in such a manner that, when the lamps L are at the proper intensity and the same current is passing through the helix $m^2$, the self-acting rheostat will be in a normal or inactive position, and its wheels will continue to revolve without acting upon the rack. If, now, one lamp is turned out, the electric current passing through the other lamps and through the helix $m^2$ will be intensified in its action, and the axial core will move the rocking frame, bringing the revolving wheel $n'$ into contact with the rack, and thereby slide the spring $t$ to the right, and lessen the resistance in the shunt-circuit 12 and 13, and reduce the field-magnets and the current through them and the lights until the standard equilibrium is attained. The reverse operation takes place when additional lights are placed in the circuit, as the lessening of the magnetic power of $m^2$ causes the wheel $m$ to act and move the contact $t$ to the left and increase the resistance in 12 13 and augment the current in the circuit 10 11. By this means, the action of the rheostat being automatic, the current in the circuit 12 and 13 is varied, and in so doing the current in the circuit 10 11 is rendered uniform, or nearly so, in order that it may be adapted to the greater or less number of lights or other working devices included in the circuit.

Figure 4:
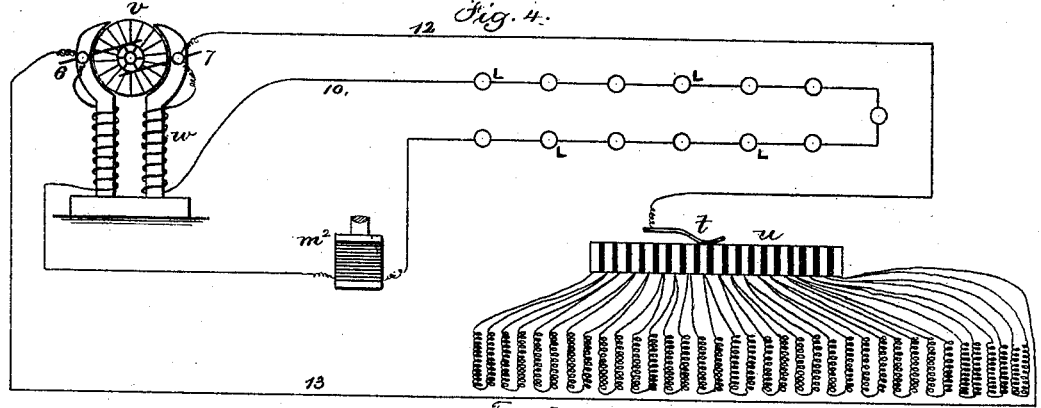

In Fig. 4 the action of the rheostat is similar to that before described; but the helix of the axial magnet and the lights or other working devices are in one continuous circuit, that also passes through the helices of the field-magnets. In this arrangement, if the intensity of the lights increases, the magnetism of the electro-magnet $m^2$ is augmented, and the rheostat is moved, and the resistance in the shunt between the commutator-springs is lessened to reduce the electric energy passing off on the line-circuit, 10 and the reverse.

Figure 5:
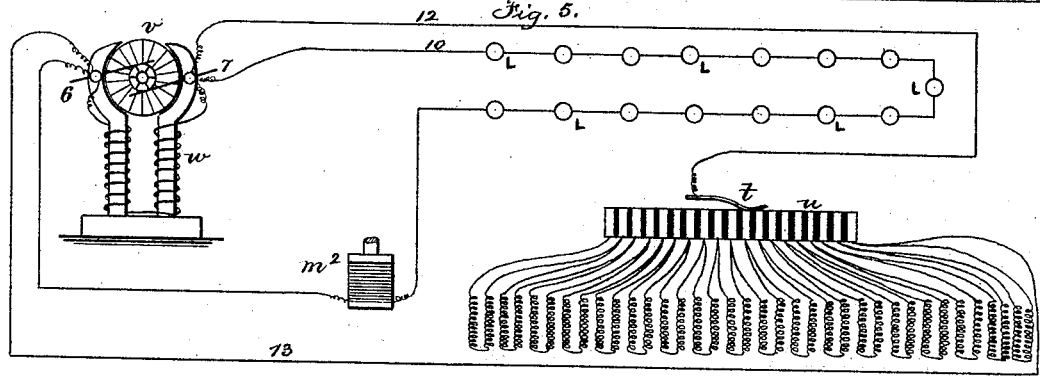

In Fig. 5 the helices of the field-of-force magnets are included in a shunt-circuit from the wires 10, lamps, and electro-magnet $m^2$, and the action of the automatic rheostat is the same as before, to vary the resistance in the shunt 12 13 between the commutator-springs, and thus reduce or increase the electric energy and unify the action of the current.

Figure 6:
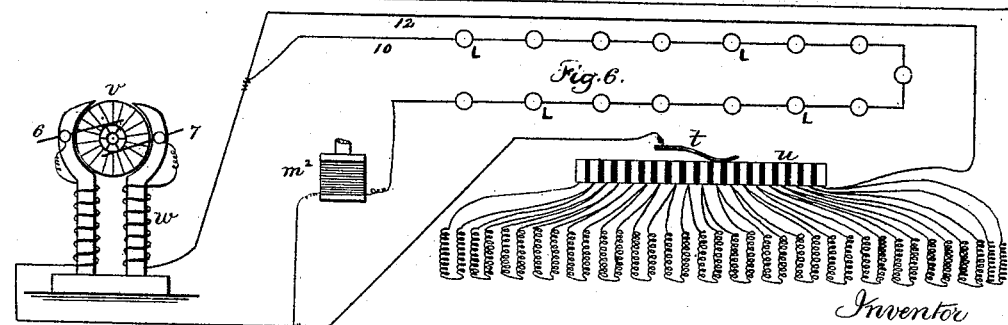

In Fig. 6 the circuits start from the commutator-springs and pass through the field-magnets, so that the main-line circuit contains the field-helices, the lamps, and the helix of $m^2$, and the rheostat is in a shunt from the working circuit, and serves to equalize the current passing over that circuit, so that its action in each lamp is the same regardless of the number.

In Fig. 7 the diagram shows the circuit-connections with the rheostat, electro-magnet $m^2$, and lamps, all in the same circuit. In this case the increase or decrease of electric energy will cause a movement of the contact-spring one way or the other until the rheostat establishes the normal condition of the line.

I remark that the power from a continuously-revolving shaft may be used to move the contact-spring $t$ through the agency of a screw, instead of the group of wheels and teeth. In the diagrammatic view, Fig. 8, I have represented this modification of the automatic rheostat. In this the axial magnet $m^2$ operates a circuit-changing lever. 21 and 22 is a local battery and circuit-connections to the electro-magnet 23, and 24 is a polarized armature-lever, one end of which is adjacent to the cores of the electro-magnet 23, and the other end carries a clutch, 25. When the axial magnet $m^2$ increases in energy it acts, by the lever 21, to close the circuit from 22 through the point 26, and this energizes the electro-magnet 23 and moves the lever 24 and clutch in one direction. When the energy of the axial magnet $m^2$ diminishes below the standard the movement of the lever 24 in the other direction closes the circuit from 22 through the helix of the electro-magnet 23 in the opposite direction, and by changing its polarity throws the armature and the clutch in the other direction. This clutch is, between pulleys 30 and 31, rotated in opposite directions by competent power; and upon the clutch is a pulley with a band to the wheel 32, forming a nut for the screw $k'$ to move said screw endwise. According to the direction in which the polarized armature is moved, so the nut will be rotated one way or the other way, and the rheostat contact-spring $t$ will bring in or cut out resistance. When the axial magnet is at its normal energy its power will be balanced by the adjusting-spring 33, or a weight, and the polarized armature and lever 24 would be balanced by adjusting-springs or a weight, and hence the clutch will not be moved into contact with either of the revolving wheels, and the rheostat will remain unchanged.

Two electro-magnets, with armature of soft iron on lever 24, may be used, as shown by dotted lines, Fig. 8, instead of the one magnet, the circuit-wires from the local battery being arranged to energize either one magnet or the other, according to the direction of movement of the lever 21.

I claim as my invention—

1. The combination, with a rheostat or series of resistance-coils and a movable contact, of an electro-magnet, a shaft revolved continuously by power, and mechanism between the movable contact and the revolving shaft, brought into action by the electro-magnet, to vary automatically the resistance of the rheostat in proportion to the variation of the electric current in the magnet, substantially as set forth.

2. The combination, with the rheostat-coils and the movable contact, of a rack, a swinging frame, an electro-magnet acting upon such swinging frame, and revolving gearing moved by that swinging frame, and acting to give motion to the rack either in one direction or the other to vary the resistance in the circuit automatically, substantially as set forth.

Signed by me this 12th day of March, A. D. 1881.

CLINTON M. BALL.

Witnesses:
   GEO. T. PINCKNEY,
   CHAS. H. SMITH.